US010683961B1

(12) United States Patent
Stutesman et al.

(10) Patent No.: US 10,683,961 B1
(45) Date of Patent: Jun. 16, 2020

(54) PLATFORM ASSEMBLY

(71) Applicants: Darren L. Stutesman, Mishawaka, IN (US); Stewart E. Gardner, Elkhart, IN (US)

(72) Inventors: Darren L. Stutesman, Mishawaka, IN (US); Stewart E. Gardner, Elkhart, IN (US)

(73) Assignee: Cass Hudson Co., Inc.

( * ) Notice: Subject to any disclaimer, the term of this patent is extended or adjusted under 35 U.S.C. 154(b) by 0 days.

(21) Appl. No.: 16/504,128

(22) Filed: Jul. 5, 2019

(51) Int. Cl.

| | |
|---|---|
| ***F16M 11/04*** | (2006.01) |
| ***F16M 11/18*** | (2006.01) |
| ***B60N 3/00*** | (2006.01) |
| ***B60N 2/34*** | (2006.01) |
| ***B60N 2/90*** | (2018.01) |
| *B60P 3/39* | (2006.01) |

(52) U.S. Cl.
CPC .......... *F16M 11/046* (2013.01); *F16M 11/18* (2013.01); *B60N 2/34* (2013.01); *B60N 2/919* (2018.02); *B60N 3/008* (2013.01); *B60P 3/39* (2013.01); *F16M 2200/025* (2013.01); *F16M 2200/047* (2013.01)

(58) Field of Classification Search
CPC ................ F16M 11/046; F16M 11/18; F16M 2200/047; F16M 2200/025; B60N 3/008; B60N 2/34; B60N 2/919; B60N 2002/952; B60P 3/39; B60P 1/64
See application file for complete search history.

(56) References Cited

U.S. PATENT DOCUMENTS

| | | | | |
|---|---|---|---|---|
| 3,266,062 A * | 8/1966 | Rogers | B60P 3/38 | 5/118 |
| 3,866,548 A * | 2/1975 | Skonieczny | A47B 5/06 | 108/79 |
| 4,022,136 A * | 5/1977 | Schott | A47B 3/00 | 108/108 |
| 5,236,171 A * | 8/1993 | Holmquist | A47B 9/02 | 248/584 |
| 5,984,404 A * | 11/1999 | Novoa | A47C 17/84 | 296/190.01 |
| 6,231,114 B1 * | 5/2001 | Warmoth | A47C 17/80 | 296/170 |
| 6,557,190 B2 * | 5/2003 | Bailey | A47C 17/84 | 296/190.02 |
| 6,629,322 B1 * | 10/2003 | Monroe | A47C 17/84 | 5/10.2 |

(Continued)

FOREIGN PATENT DOCUMENTS

DE 102009000845 A1 * 8/2010 ............ F25D 25/02

*Primary Examiner* — Hanh V Tran
(74) *Attorney, Agent, or Firm* — Crump Law P.C.

(57) ABSTRACT

The platform assembly provides a platform deck that manually deploys between raised and lowered positions and ensures a specific order of operation when moving the deck between the raised and lowered positions. The platform assembly includes a deck, which rides on a roller disposed within upright slide rails mounted to opposed interior walls of the trailer, vehicle or structure. The deck is supported by a horizontal side member in the lowered position and a support bracket and two sets of piston props in the raised position. The platform assembly uses a pair of stop pins that ride within a vertical channel in the upright slide rails and seat within notches formed in the rail channels.

10 Claims, 12 Drawing Sheets

(56) References Cited

U.S. PATENT DOCUMENTS

| | | | | |
|---|---|---|---|---|
| 8,336,940 | B2 * | 12/2012 | Rasmussen | A47C 17/84 296/24.33 |
| 9,656,590 | B2 * | 5/2017 | Johnson | A47C 17/80 |
| 2004/0178399 | A1 * | 9/2004 | Blodgett, Jr. | B60P 3/39 254/424 |
| 2006/0066131 | A1 * | 3/2006 | Nebel | B60P 1/02 296/156 |
| 2007/0102975 | A1 * | 5/2007 | Gardner | B60P 3/39 297/245 |
| 2007/0226901 | A1 * | 10/2007 | Pervorse | A47C 17/84 5/118 |
| 2008/0116012 | A1 * | 5/2008 | Ferguson | B60P 3/36 187/213 |
| 2009/0110528 | A1 * | 4/2009 | Walter | A47C 17/84 414/609 |
| 2012/0124738 | A1 * | 5/2012 | Jones | A47C 17/80 5/10.2 |
| 2014/0238279 | A1 * | 8/2014 | Maas | A47B 9/02 108/146 |
| 2014/0310873 | A1 * | 10/2014 | Gosling | A47C 19/20 5/136 |
| 2015/0041601 | A1 * | 2/2015 | Quigley | B60P 3/39 248/125.1 |
| 2015/0323122 | A1 * | 11/2015 | Gardner | F16M 11/18 254/385 |
| 2016/0278514 | A1 * | 9/2016 | Maas | A47B 9/14 |
| 2019/0143876 | A1 * | 5/2019 | Spensley | B60N 3/008 296/174 |
| 2019/0217752 | A1 * | 7/2019 | Johnson | B60N 2/919 |

* cited by examiner 160
112
128
140
140
120
114
128
130
128
114
116
110
160
100
112
140
140
120
A
130

100
110
120
124
122
118
130
136
134
131
152
150

160
140
120
110
140
130

PLATFORM ASSEMBLY

This invention relates to a platform assembly that raises and lowers within a structure, such as a recreational vehicle or trailer, which acts as a storage or sleeping deck.

BACKGROUND AND SUMMARY OF THE INVENTION

Recreational vehicles, fifth wheel and cargo trailers often have storage and sleep platforms that can be manually raised and lowered from a stowed position for use as a bed or storage area within their interior space. While these platforms are popular and have convenient features, these platforms heretofore suffered from a variety of operational and structural issues. In particular, manually operated platforms that employ various slides, linkages and cables and using piston props to counterbalance the weight of the decks often bind when the decks are not moved in a particular manner or order.

The platform assembly of this invention provides a platform deck that manually deploys between raised and lowered positions and ensures a specific order of operation when moving the deck between the raised and lowered positions. The platform assembly includes a deck, which rides on a roller disposed within upright slide rails mounted to opposed interior walls of the trailer, vehicle or structure. The deck is supported by a horizontal side member in the lowered position and a support bracket and two sets of piston props in the raised position. The platform assembly uses a pair of stop pins that ride within a vertical channel in the upright slide rails and seat within notches formed in the rail channels. The stop pin and the configuration of notches and the edges of the rail channel help ensure smooth operation, as well as the proper order of operation when raising and lowering the deck.

These and other advantages of the present invention will become apparent from the following description of an embodiment of the invention with reference to the accompanying drawings.

BRIEF DESCRIPTION OF THE DRAWINGS

The drawings illustrate an embodiment of the present invention, in which.

DESCRIPTION OF THE PREFERRED EMBODIMENT

Figure 1:
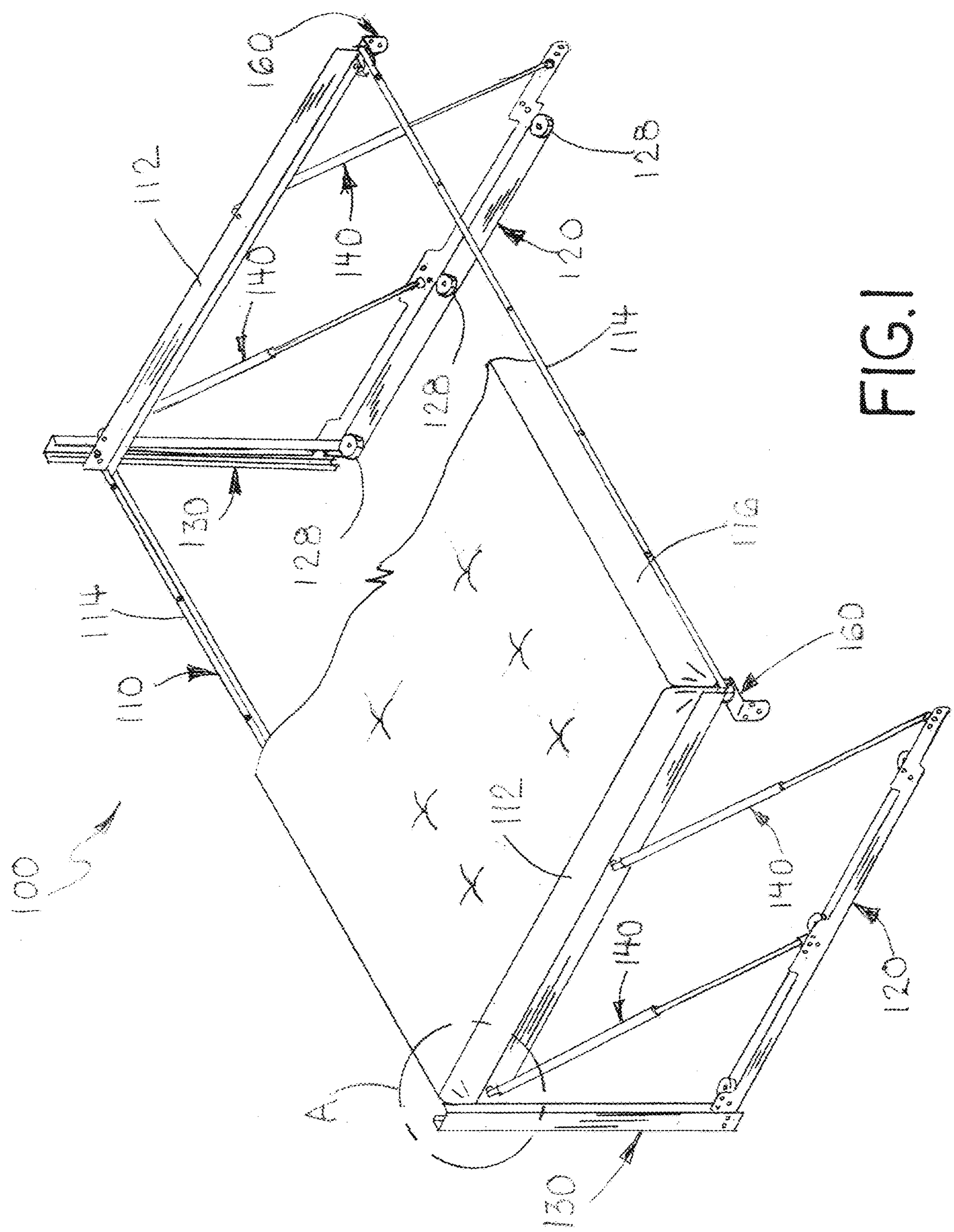
FIG. 1 is a perspective view of an exemplary embodiment of the platform assembly of this invention.
Figure 2:
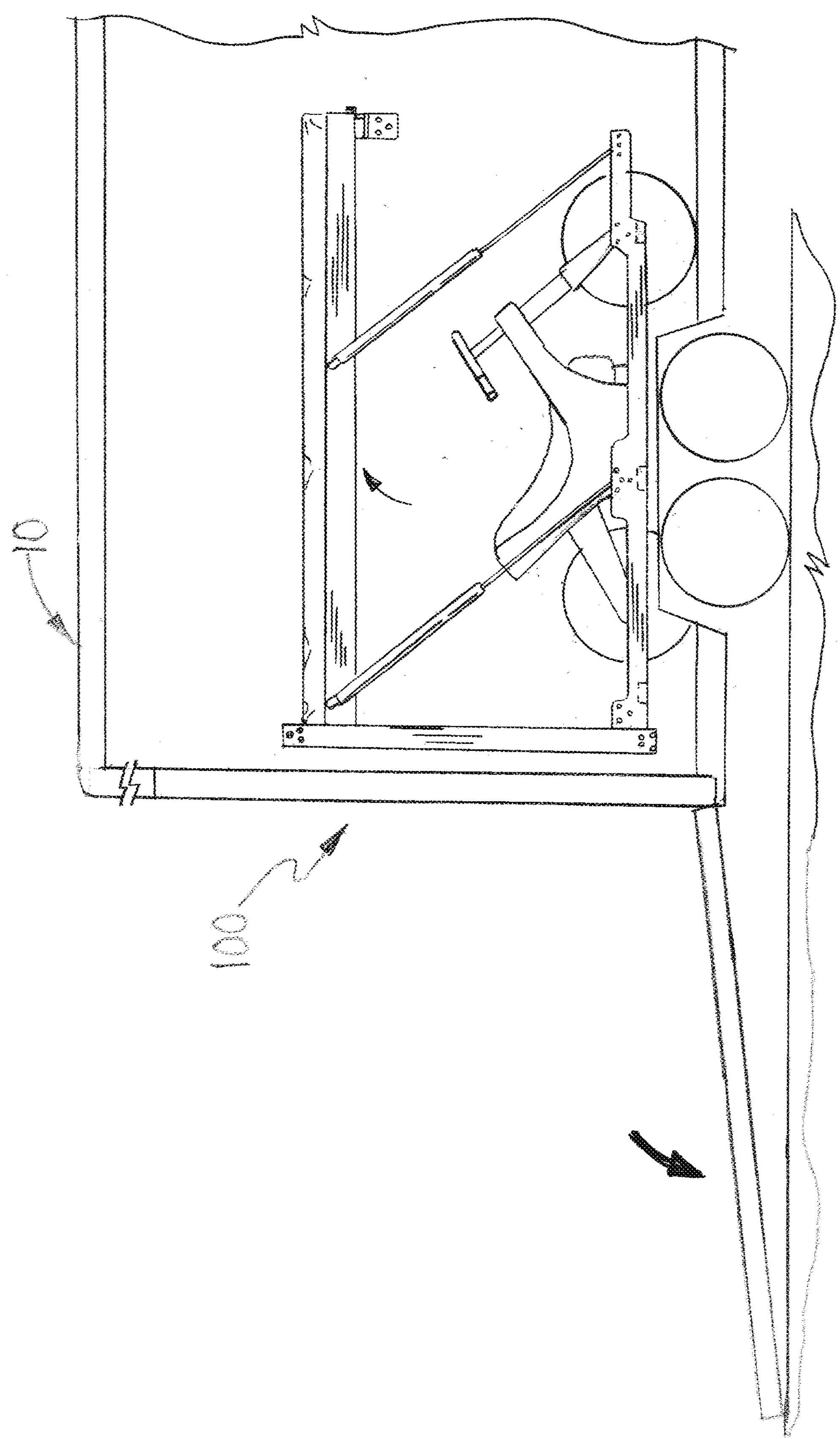
FIG. 2 is a partial side sectional view of the platform assembly of FIG. 1 incorporated into a trailer shown in the raised position.
Figure 3:
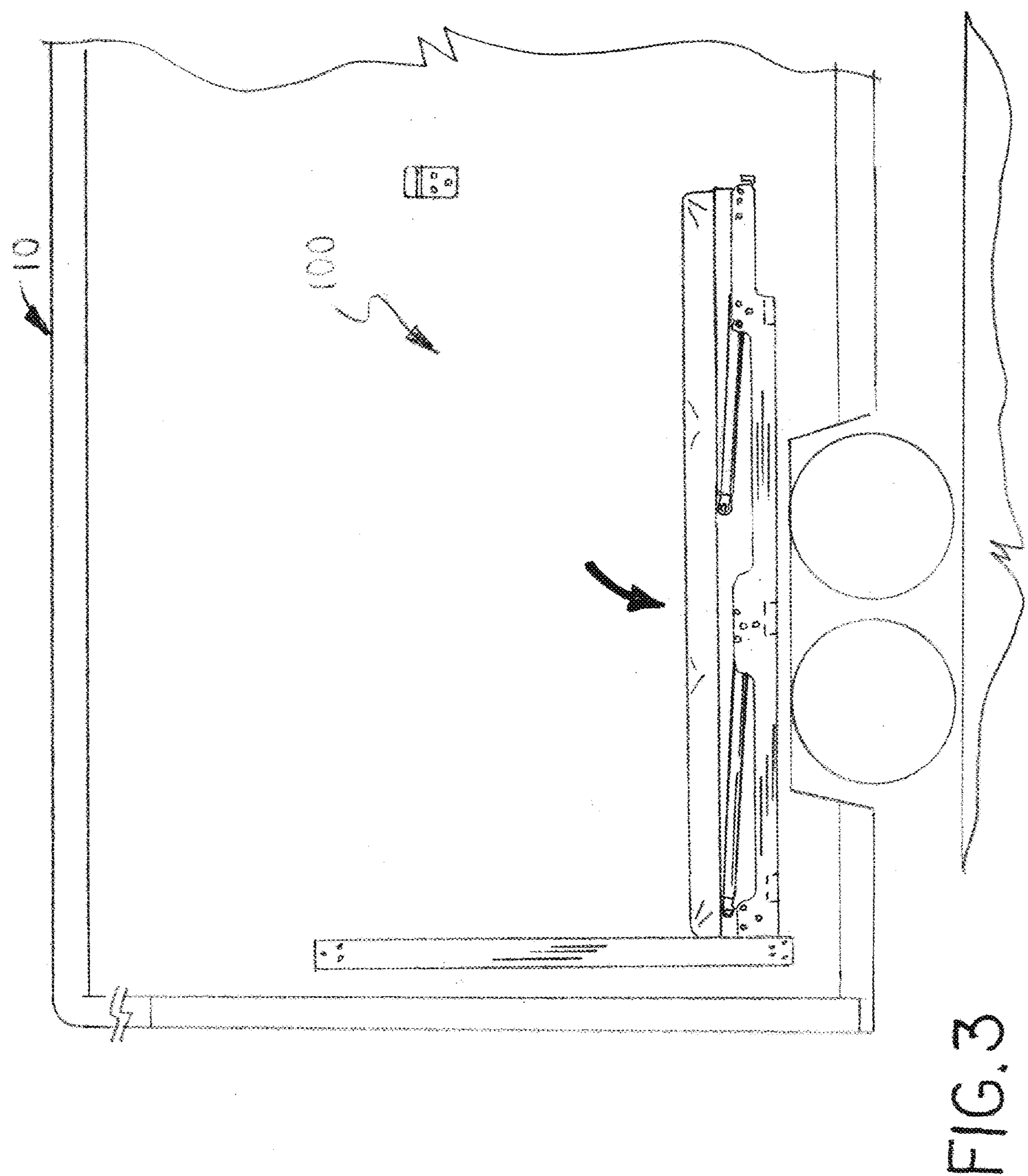
FIG. 3 is another partial side sectional view of the platform assembly of FIG. 1 incorporated into a trailer shown in the lowered position.
Figure 4:
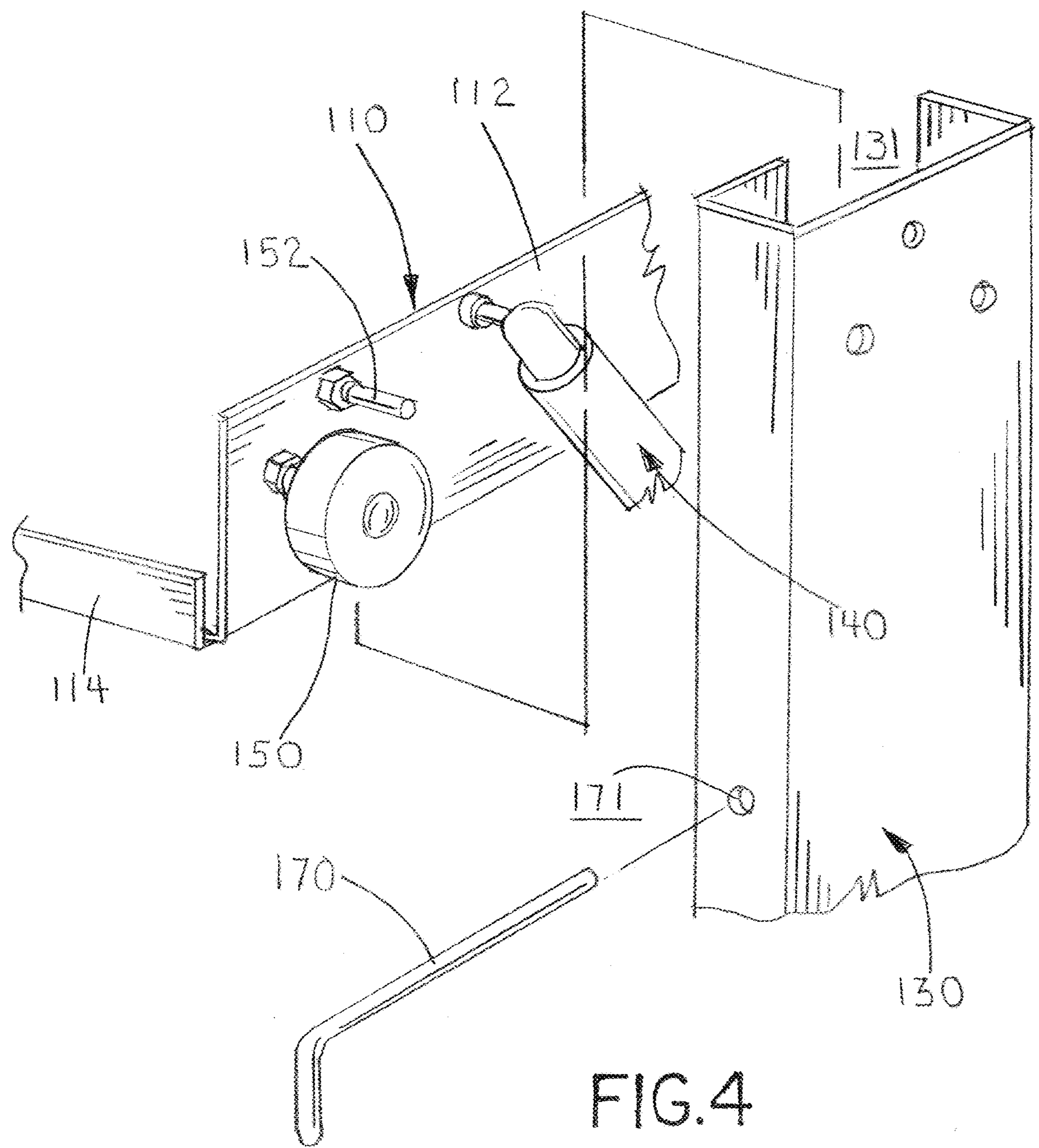
FIG. 4 is a partial exploded view of the platform assembly from area A of FIG. 1.
Figure 5:
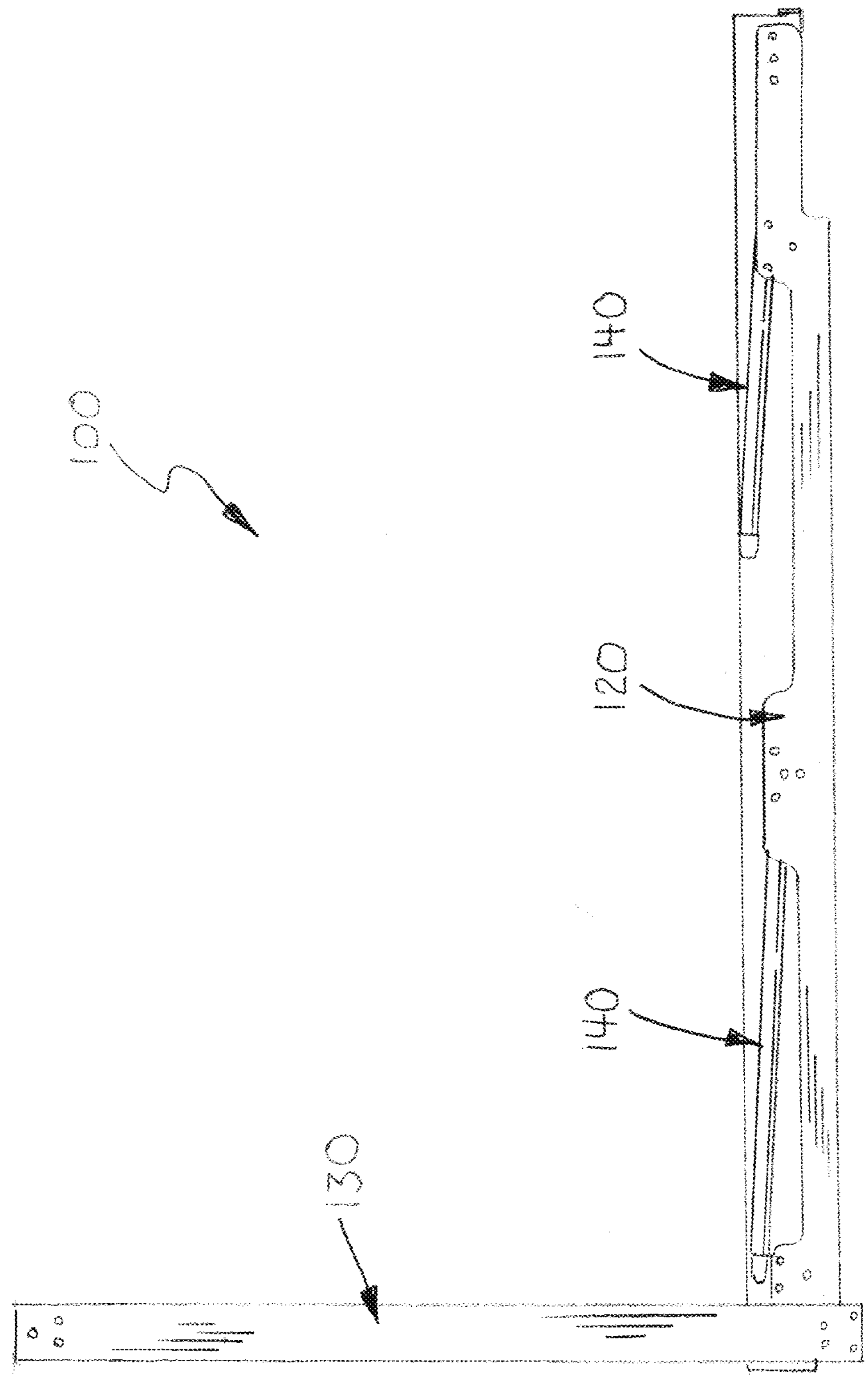
FIG. 5 is a side view of the platform assembly of FIG. 1 in the lowered position.
Figure 6:
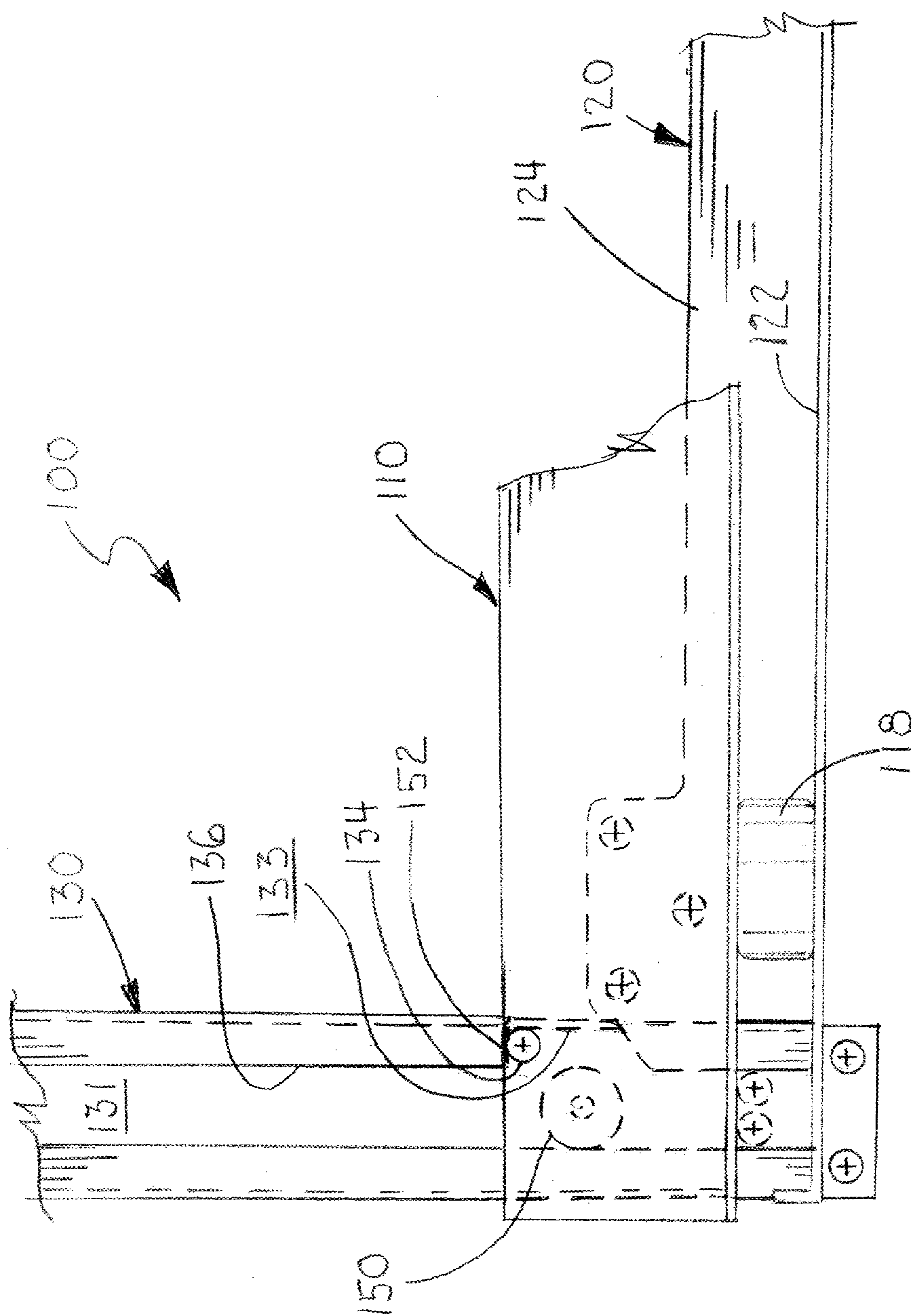
FIG. 6 is a partial side view of the platform assembly of FIG. 1 in the lowered position.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical and material composition changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

FIGS. 1-12 depict an exemplary embodiment of the platform assembly of this invention, which is designated generally as reference numeral 100. Platform assembly 100 provides a horizontal deck that can be manually moved between raised and lowered positions within the interior space of a cargo trailer, recreational vehicle or dwelling structure. While platform assembly 100 is generally designed and intended for use in cargo trailers and recreational vehicles, it may be modified for other purposes in other structures and applications.

As shown, platform assembly 100 includes four basic structural components: a deck frame 110; a pair of lift supports 120; a pair of upright rails 130; two sets of gas props 140; and a pair of deck rest brackets 160. The structural components of platform assembly 100 are generally built into and/or mounted to the interior walls and super structure of the trailer or recreational vehicle. The platform assembly may be modified in other embodiments to be a free standing structure within the living or working interior of the trailer or recreational vehicle.

Deck 110 includes a structural steel frame and a flat sheet of plywood, composite material or metal (not shown). In certain applications, deck frame 110 is designed and dimensioned to support a conventional mattress and/or box spring along with other bedding. The deck frame 1 includes a pair of side members 112 and two or more cross members 114. Side supports 120 are lengths of angle horizontally mounted to the interior sidewalls of the trailer, vehicle or structure. Each side support 120 has a horizontal flange 122 and a vertical flange 124. Deck pads 128 are mounted atop the horizontal flanges 122. Upright rails 130 are upright lengths of box channel vertically mounted to opposed interior sidewalls of the trailer, vehicle or structure. The inward face of each upright rail 130 has a vertical slot or channel 131 extending the length of the rail. A notch 133 is cut or formed on one side of the inner edges of the inward rail face near the bottom of rail channel 131. Piston props 140 are of conventional gas or pneumatic props and selected to assist in counterbalancing the weight of the deck when manually moving deck between the raised and lowered positions. As shown, piston props 140 are pivotally mounted at a select angle, generally between 30 and 45 degrees, between side supports 120 and frame side members 112.

To simplify further explanation of the construction and operation of platform assembly 100, deck 110 is referred to have opposed sides situated along the interior sidewalls of the trailer, vehicle or structure, and a rearward end situated between slide rails 130 and a forward end opposite the rearward end. A roller 150 is mounted to the rearward end of each side member 112. Rollers 150 extend through slot 131 to ride within upright rail 130, which allows the rearward end of deck 110 to vertically traverse the length of upright rail 130. In addition, stop pins 152 are mounted to the rearward end of each side member 112 adjacent rollers 150. Stop pins 152 also extend through rail channel 131 into upright rail 130. In the lowered position (FIGS. 3, 5 and 6), deck 110 rests atop pads 118 affixed to side support 120. Stop pins 152 seats within notch 133 and abut against an edge shoulder 134 when deck 110 is in the lowered position. In the raised position (FIGS. 2, 11 and 12), the deck 110 rests atop a deck pad 168 affixed atop support brackets 160 mounted to opposed interior walls of the trailer, vehicle or structure. Removable lock pins 170 that extend through aligned holes in upright rails 130 further lock and support the rearward end of deck 110.

Figure 7:
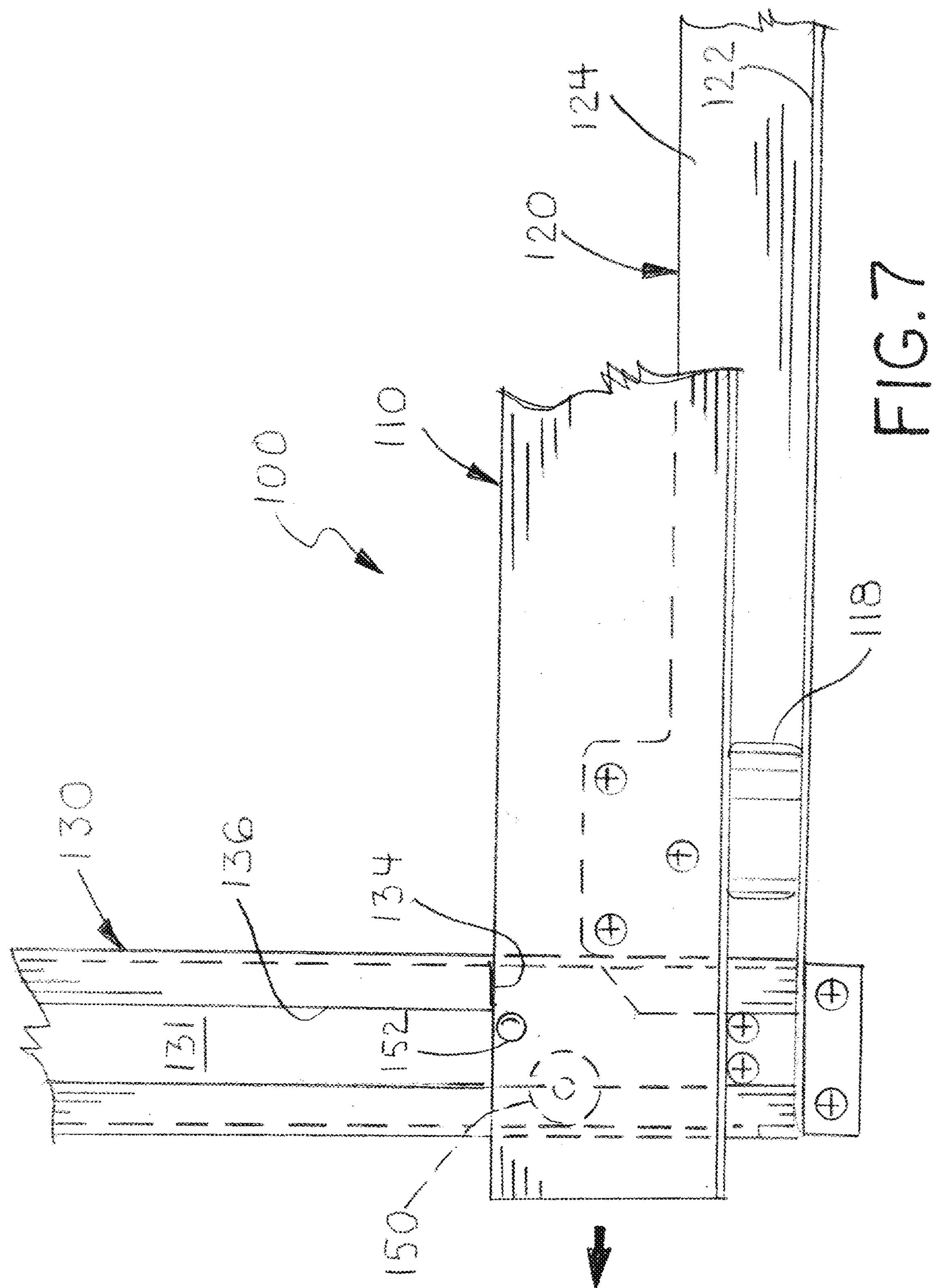
FIG. 7 is another partial side view of the platform assembly of FIG. 1 in the lowered position with the deck supports shifted rearward.
Figure 8:
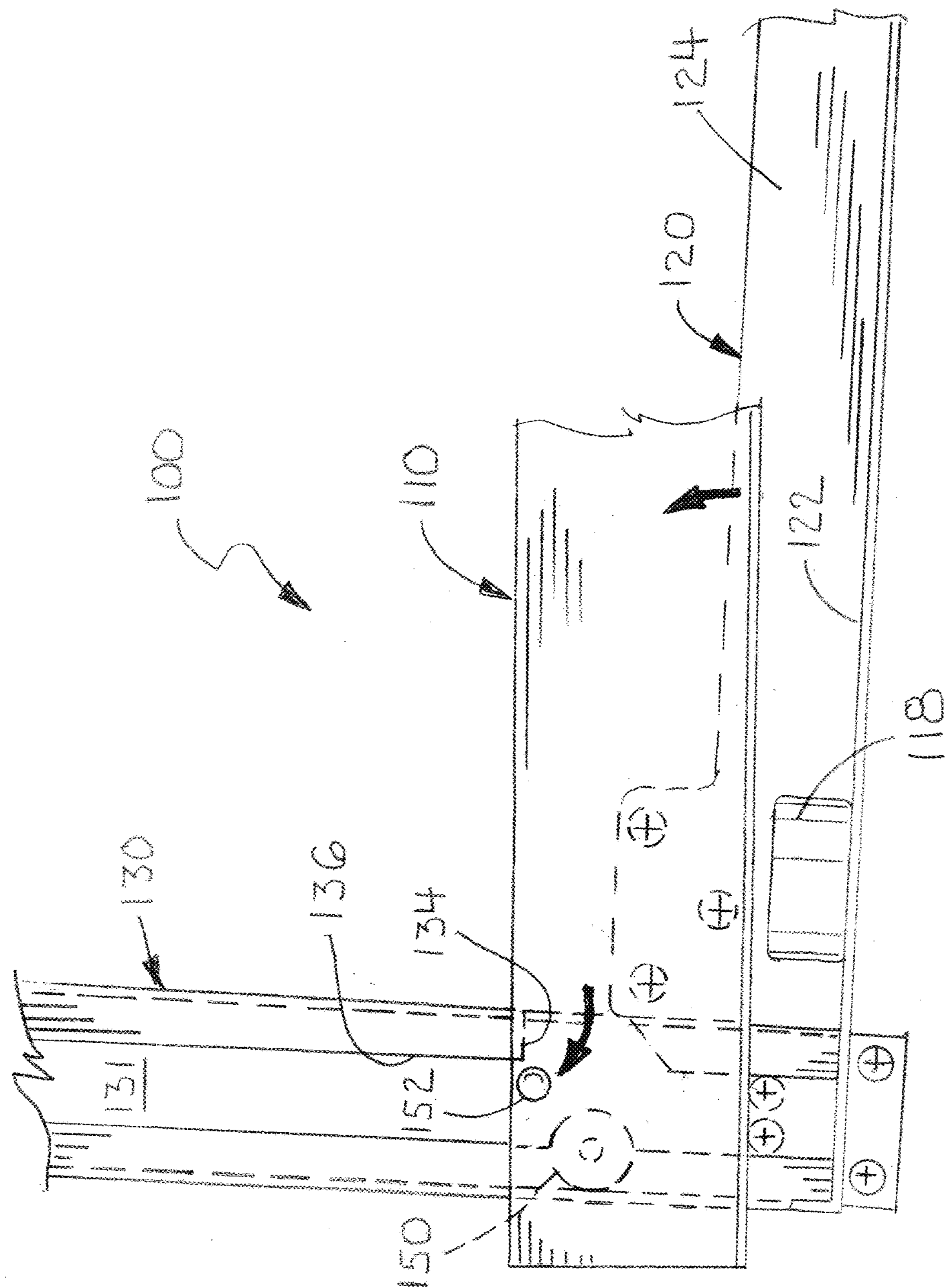
FIG. 8 is another partial side view of the platform assembly of FIG. 1 in the lowered position with the deck supports shifted rearward and partially lifted.
Figure 9:
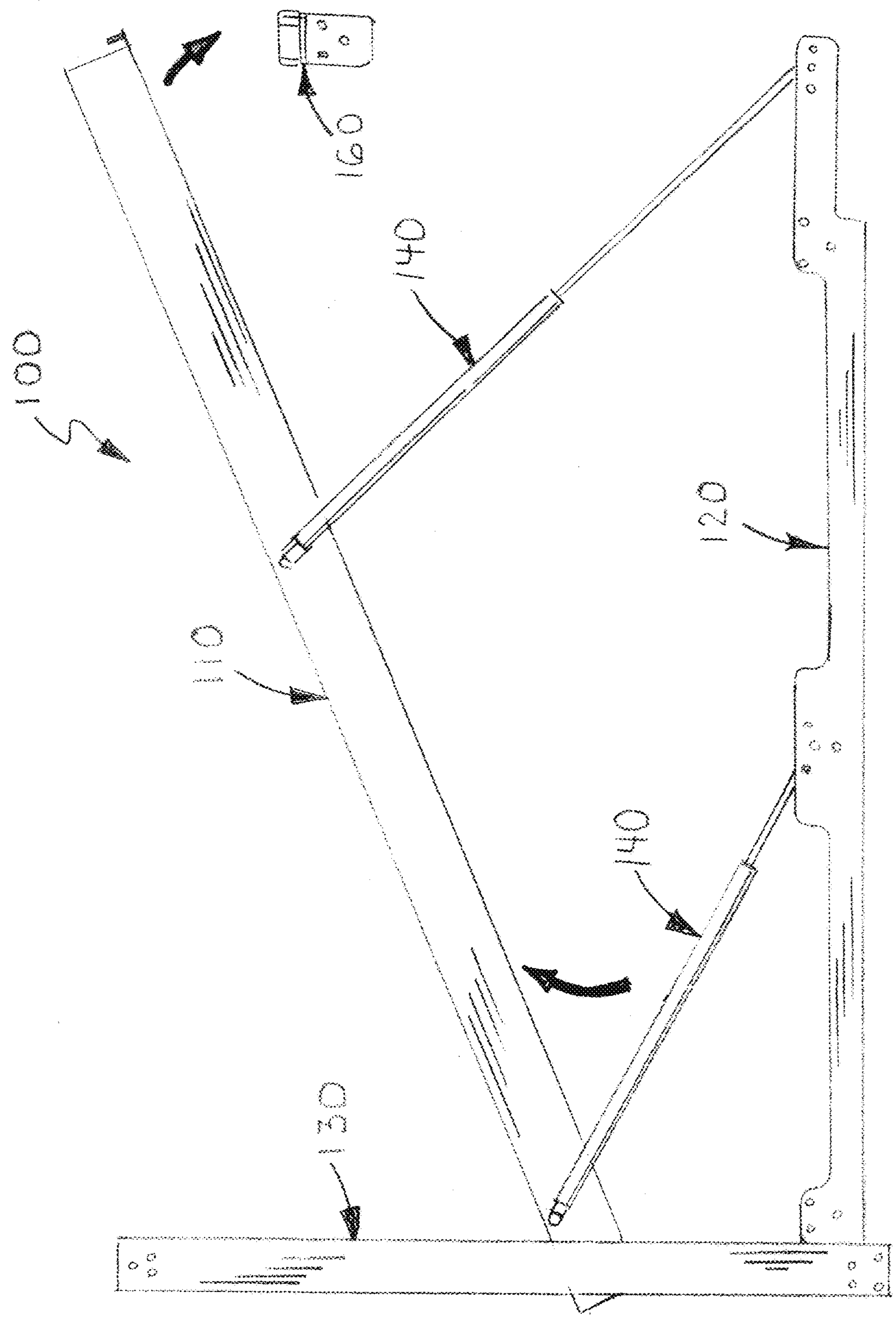
FIG. 9 is a side view of the platform assembly of FIG. 1 in a partially raised position.
Figure 10:
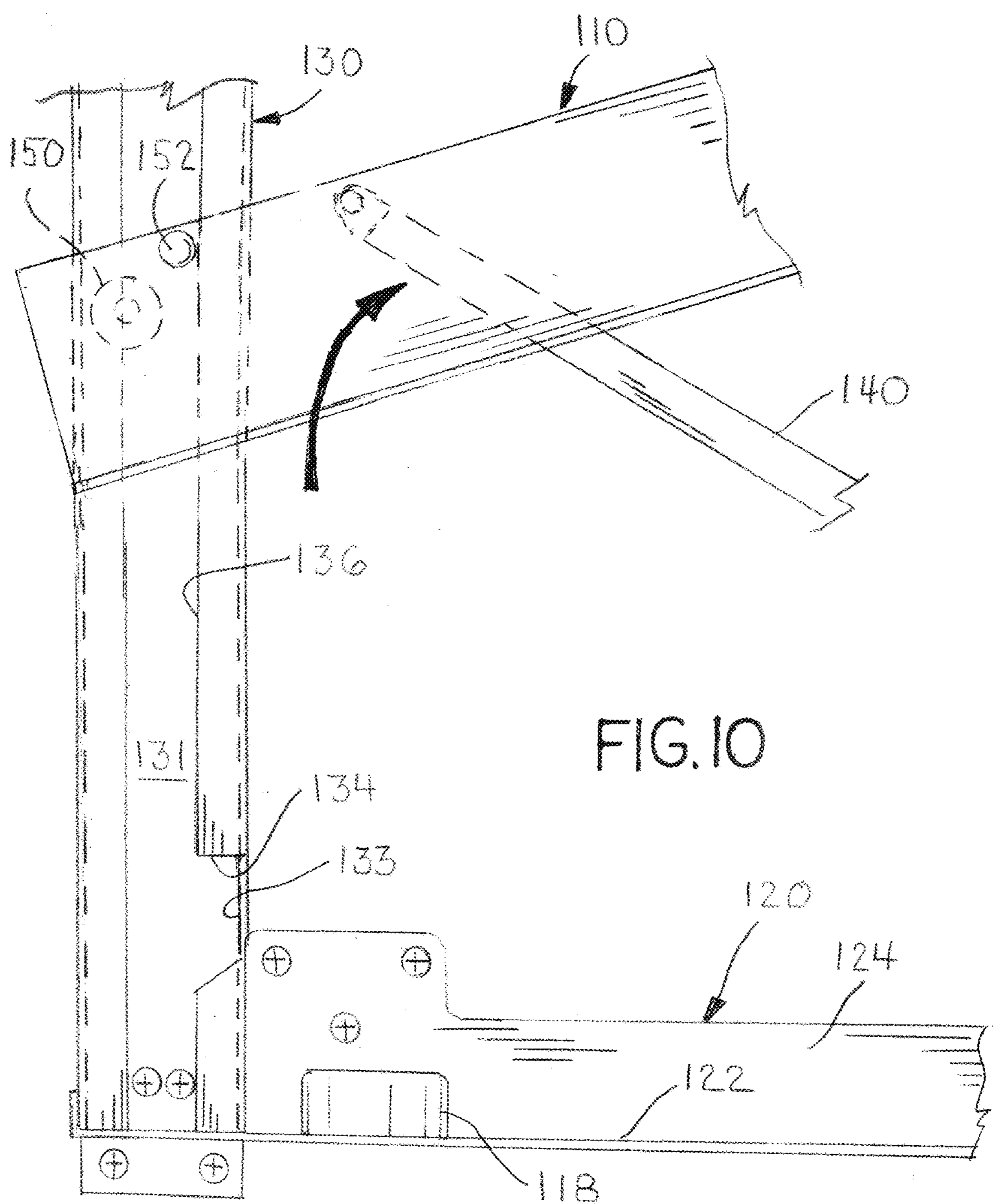
FIG. 10 is a partial side view of the platform assembly of FIG. 1 in a partially raised position.
Figure 11:
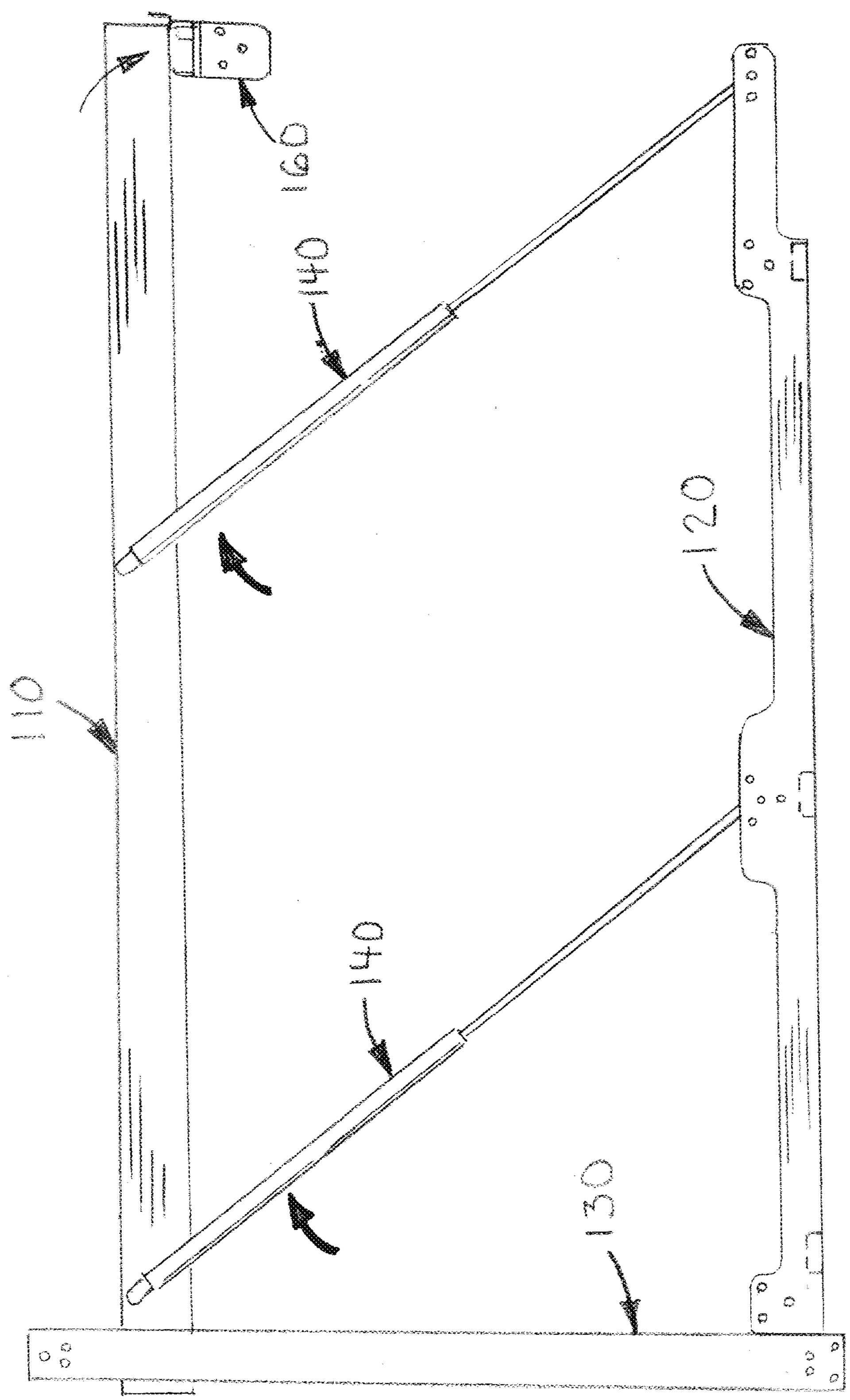
FIG. 11 is a side view of the platform assembly of FIG. 1 in the raised position.
Figure 12:
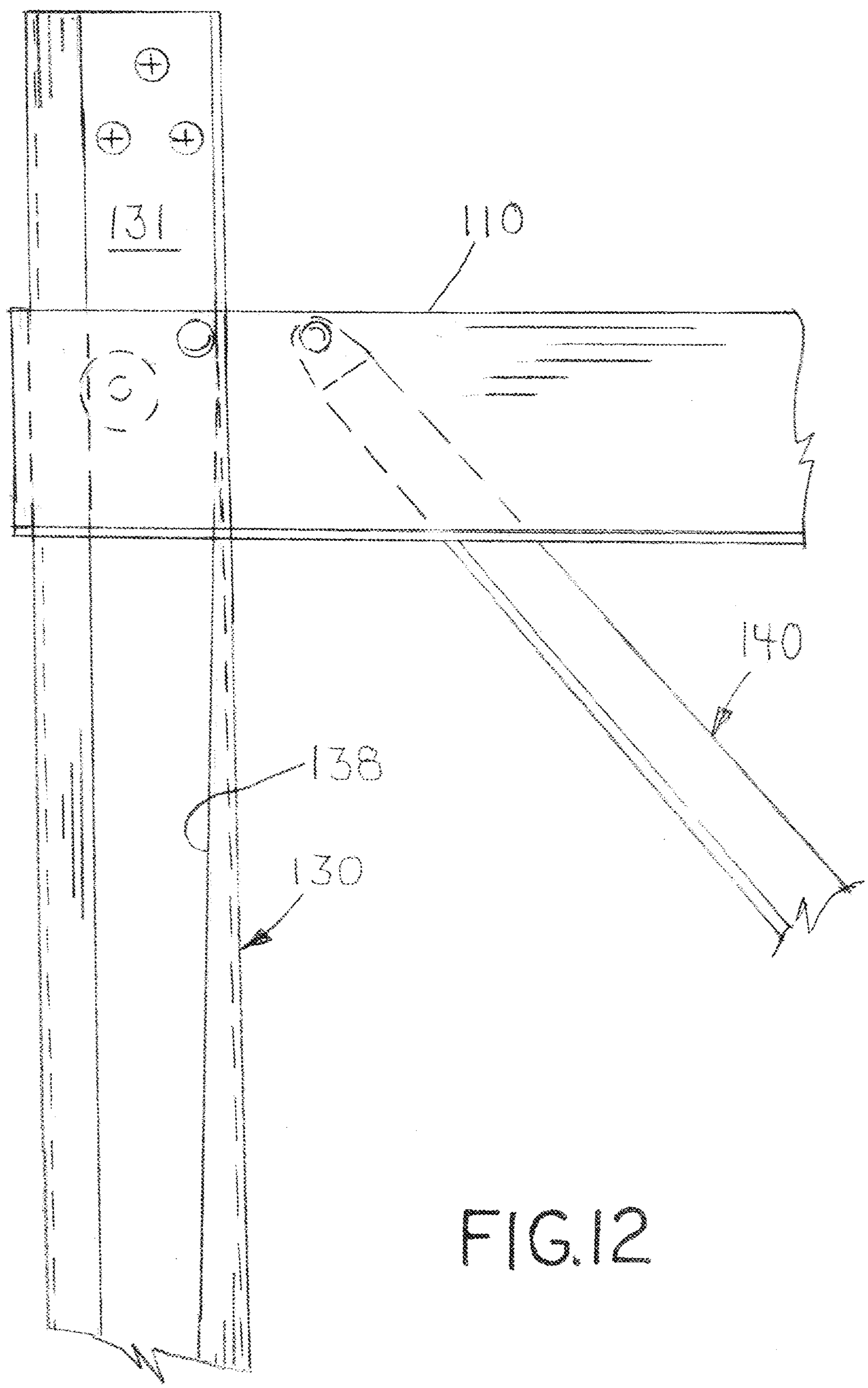
FIG. 12 is a partial side view of the platform assembly of FIG. 1 in the raised position.

In operation moving deck 110 from the lowered position to the raised position, deck 110 is manually pushed rearward to shift stop pin 152 from edge shoulder 134 into rail channel 131 (FIG. 7). Next, the forward end of deck 110 is manually lifted so that stop pin 134 rides against channel edge 136. As deck 110 is manually lifted towards the raised position, deck 110 is oriented at an angle with the forward end elevated above the rearward end (FIGS. 9 and 10). As deck 110 reaches the raised position, the rearward end of deck 110 is lifted to the top of upright rails 130 and the forward end of deck 110 rocks forward over deck supports 160 (FIG. 11). As the forward end of deck 110 begins to pivot down and forward, stop pin 152 rides along an angled channel edge 138 of rail channel 131, which provides increasing slot width to accommodate the pin's movement long the slot as the deck pivots forward (FIG. 12). Props 140 provide a significant portion of the lifting force needed to manually lift deck 110 into the raised position. When deck 110 is being lifted, the forward most props 140 extend first raising the forward end of the deck (FIG. 9). The rear most props extend to help lift the rearward end of deck 110. Both sets of props 140 are fully extended to support deck 110 in the raised position (FIG. 11).

In operation moving deck 110 from the raised position to the lowered position, the process is reversed. The rearward end of deck 110 is manually pulled downward compressing the rearmost prop 140 and pivoting the forward end of the deck off of support brackets 160. Next, deck 110 is pulled gently downward at an angular orientation compressing props 140 until the rearward end of deck 110 reaches the bottom of upright rails 130 and stop pins 152 reach notches 133. Lastly, the forward end of deck 110 is pivoted downward to rest deck 110 atop pads 118 of side support 120 and seat stop pins 152 within notches 133 against edge shoulder 134. Props 140 are fully compressed when deck 110 is in the lowered position. It should be noted that stop pins 152 ensure the proper order of operation for raising and lowering deck 110. With stop pins 152 seated within notches 133, the rearward end of deck 110 can only be raised after the forward end of deck 110 is lifted into an angular orientation. Similarly, when moving toward the lowered position, the rearward end of deck 110 must be fully lowered before the forward end of deck 110 can be pivoted downward. Stop pin 152 and the configuration of notches 133 and the channel edges 136 and 138 help ensure smooth operation, as well as the proper order of operation when raising and lowering deck 110.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. A platform assembly comprising:

an elongated upright rail having an interior therein and a longitudinal channel defined in part by a pair of opposed channel edges, the upright rail having a top end and bottom end thereof;

a side support member extending horizontally from the bottom of the upright rail;

a planar deck shiftably carried by the upright rail for vertical movement along the length of the upright rail between a raised position adjacent the top end and a lowered position adjacent the bottom end, the deck having a rearward end and a forward end thereof; and a set of first and second piston props for counterbalancing the weight of the deck when the deck is moved between the raised and lowered positions, the deck having a roller extending through the channel and disposed within the upright rail interior for rolling movement along the length of the upright rail, the deck also having a stop pin extending through the channel into the upright rail interior, one of the channel edges has a notch formed therein opening into the channel, the stop pin seated within the notch when the deck is in the lowered position.

2. The platform assembly of claim 1 wherein the stop pin rides against the one of the channel edges when the deck moves between the raised position and the lowered position.

3. The platform assembly of claim 2 wherein the one of the channel edges has a lower portion thereof parallel to the other of the channel edges at the bottom end of the upright rail and an upper portion thereof diverging from the other of the channel edges at the top end of the upright rail.

4. The platform assembly of claim 1 wherein the set of first and second piston props are extended when the deck is in the raised position, the set of first and second piston props are compressed when the deck is in the raised position.

5. The platform assembly of claim 1 wherein the forward end of the deck is raised before the rearward end of the deck when the deck moves from the lowered position to the raised position, the rearward end of the deck is lowered before the forward end of the deck when the deck is moved from the raised position to the lowered position.

6. In a structure having opposed sidewalls, a platform assembly comprising:

an elongated upright rail mounted to each opposed sidewall, each upright rail having an interior therein and a longitudinal channel defined in part by a pair of opposed channel edges, the upright rail having a top end and bottom end thereof;

a side support member mounted to each opposed sidewall and extending horizontally from the bottom of the adjacent upright rail;

a planar deck shiftably carried between the upright rails for vertical movement relative to the upright rails between a raised position adjacent the top end of the upright rail and a lowered position adjacent the bottom end the upright rail, the deck having a rearward end and a forward end thereof; and two sets of first and second piston props each pivotally mounted to one of the side support members and the deck for counterbalancing the weight of the deck when the deck is moved between the raised and lowered positions, the deck having a roller disposed within the rail interior of each of the upright rails for rolling movement along the length of the upright rails, the deck also having a stop pin extending through the channel into the upright rail interior of each of the upright rails, one of the channel edges of each upright rail has a notch formed therein opening into the channel, the stop pin seated within the notch when the deck is in the lowered position.

7. The platform assembly of claim 6 wherein the stop pins ride against the one of the channel edges when the deck moves between the raised position and the lowered position.

8. The platform assembly of claim 7 wherein the one of the channel edges of each of the upright rails has a lower portion thereof parallel to the other of the channel edges at the bottom end of the upright rail and an upper portion thereof diverging from the other of the channel edges at the top end of the upright rail.

9. The platform assembly of claim 6 wherein each of sets of first and second piston props are extended when the deck is in the raised position, each of the sets of first and second piston props are compressed when the deck is in the raised position.

10. The platform assembly of claim 6 wherein the forward end of the deck is raised before the rearward end of the deck when the deck moves from the lowered position to the raised position, the rearward end of the deck is lowered before the forward end of the deck when the deck is moved from the raised position to the lowered position.

* * * * *